Sept. 1, 1964 A. A. H. JOHNSON ETAL 3,147,048
TRACK ROLLER FOR A TRACK-LAYING VEHICLE
Filed Dec. 9, 1960
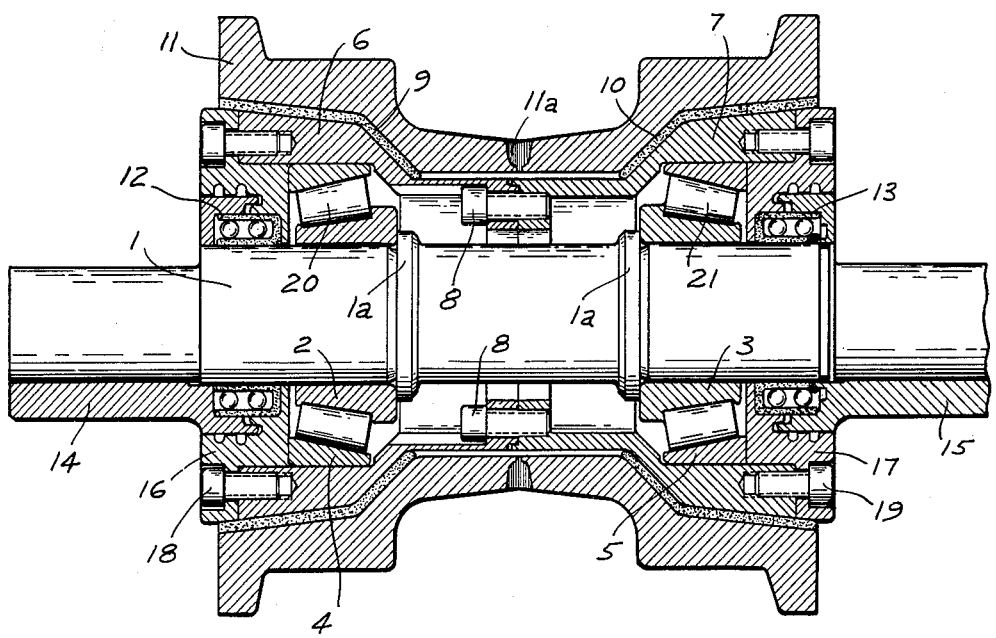
INVENTORS
ALF ALVAR HAMPUS JOHNSON
HENRY WILHELM ALDRIN
BY
ATTORNEYS

United States Patent Office 3,147,048
Patented Sept. 1, 1964

3,147,048
TRACK ROLLER FOR A TRACK-LAYING VEHICLE
Alf Alvar Hampus Johnson, Karlskoga, and Henry Wilhelm Aldrin, Bofors, Sweden, assignors to Aktiebolaget Bofors, Bofors, Sweden, a Swedish company
Filed Dec. 9, 1960, Ser. No. 74,892
Claims priority, application, Sweden, Dec. 12, 1959, 11,737/59
5 Claims. (Cl. 308—18)

The present invention relates to track rollers for supporting the track of a track-laying vehicle such as a weapon carrier, a tank, or an earth moving machine.

It is known to interpose in track rollers of this kind a layer of elastic material between an outer roller sleeve in contact with the track and an inner bearing sleeve. Such elastic layer, usually formed by a winding of rubber tape, functions somewhat in the manner of a spring suspension, and it has been found that the presence of the elastic layer prolongs considerably the useful life of the roller assembly in comparison with roller assemblies that are not equipped with such "spring suspension."

It is the broad object of the present invention to provide a novel and improved track roller structure of the general kind above referred to, which can be inexpensively manufactured, has a long useful life, and the outer sleeve and elastic layer of which can be rapidly and conveniently replaced when worn out.

A specific object of the invention is to provide a novel and improved track roller, the outer sleeve of which can be made comparatively thin and hence light, thus reducing the overall weight of the entire track assembly.

Another specific object of the invention is to provide a novel and improved track roller structure, the outer sleeve of which can exert heavy pressure upon the inner bearing sleeve without damaging the interposed elastic layer.

Still another specific object of the invention is to provide a track roller structure, the parts of which most exposed to wear, namely the outer sleeve and the underlying elastic layer, can be removed and replaced without requiring complicated tools and highly skilled labor.

Other and further objects, features and advantages of the invention will be pointed out hereinafter and set forth in the appended claims constituting part of the application.

In the accompanying drawing the single figure shows a longtiudinal, sectional view of a track roller according to the invention by way of illustration and not by way of limitation.

The exemplified track roller structure is mounted upon an axle 1 which should be visualized as being secured to the chassis of a track-laying vehicle, generally stationary in reference to the chassis. The roller assembly comprises two inner ramming or locking rings 2 and 3 which are located on the axle by means of shoulders 1a formed on the axle and two outer ramming or locking rings 4 and 5. Rings 2 and 3 may be keyed or splined to the axle to prevent rotation of the rings. The rings 2, 3 and 4, 5 constitute the inner and outer races of ball or roller bearings 20 and 21 which should be visualized as being of conventional design and capable of sustaining axial and radial stresses. The outer rings support the inner or bearing sleeve formed by two halves 6 and 7 which engage each other at their inner ends and are secured together by means such as circumferentially spaced bolts 8 threaded through ears depending from the sleeve halves. Sleeve 6, 7 has a cylindrical mid portion and is increased in diameter toward both ends of the sleeve. As is shown, the increase in diameter is initially rather steep and then flattens. An elastic layer formed by two collars 9 and 10 envelops the two slanted end portions of the sleeve.

The collars may be formed by windings of tape of rubber or suitable elastic plastic.

To prevent access of moisture and dust to bearings 20 and 21, seals 12 and 13 of conventional design are slidably fitted upon axle 1. The seals are held in position by means of interlocking sealing covers 14, 16 and 15, 17, respectively. Covers 16 and 17 are secured to opposite ends of bearing sleeve 6, 7 by means such as circumferentially spaced bolts 18 and 19, respectively, screwed into the sleeve. Sleeve 6, 7, or more specifically the elastic layer 9, 10 thereon supports an outer sleeve 11. The inner peripheral configuration of the outer sleeve matches the outer peripheral configuration of the inner sleeve. Sleeve 11 which supports the track, may be made of one piece but, preferably, it is made of two symmetric halves welded together at 11a.

As is shown in the drawing, the roller structure is such that it has a central plane of symmetry transverse of the longitudinal axis of axle 1. The diameters of both the inner sleeve and the outer sleeve increase from that plane of symmetry toward both outer ends of the sleeves. As a result of such configuration, the rubber collars 9 and 10 can sustain and transmit considerable stresses without being damaged.

When sleeve 11 is worn out and it becomes necessary to replace the same, such replacement can be effected by disassembling the roller structure from one side thereof, say from the left hand side. To effect such disassembly, bolts 18 are first removed then sealing covers 14, 16 and seal 12 can be withdrawn. This permits removal of rings 2 and 4 and bearings 20. Bolts 8 are now accessible and after removal of these bolts sleeve half 6 can be withdrawn and thereupon sleeve 11. Both collars 9 and 10 and sleeve 11 can now be replaced and the entire structure is reassembled in the order opposite from that described.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A track roller for assembly on an axle of a track-laying vehicle, said track roller comprising an inner bearing sleeve having two symmetric, longitudinally aligned halves, the outer diameter of said sleeve increasing from the mid portion of the sleeve towards the outer ends thereof, said sleeve being adapted and constructed to be rotatably mounted on said axle, an outer roller sleeve encompassing the inner sleeve coaxially therewith and having an inner peripheral configuration substantially matching the outer peripheral configuration of the inner sleeve, an elastic layer sandwiched between the inner and the outer sleeve along the slanted portions thereof, and releasable locking means securing the two halves of the inner sleeve to each other at the facing ends thereof said locking means including two lugs extending from the facing ends of said halves and screw means extending through said lugs for drawing said halves axially together whereby axially directed pressure is exerted upon said sandwiched layer.

2. A track roller according to claim 1 wherein said inner bearing sleeve has a substantially cylindrical mid portion and widened outer portions increasing in diameter towards the outer ends thereof, the two parts of the inner sleeve being secured to each other at a transverse center plane through said mid portion.

3. A track roller according to claim 2 wherein said elastic layer is in the form of two collars, each enveloping one of the slanted outer portions of said inner sleeve.

4. A track roller according to claim 1 wherein said inner bearing sleeve has a substantially cylindrical mid portion and widened outer portions increasing in diameter toward the outer ends thereof, the inner peripheral configuration of the inner sleeve defining an annular space, and wherein a bearing means is fitted into said space at each end of the sleeve, and releasable sealing and fastening means securing each of said bearing means to the respective part of the inner sleeve.

5. A track roller according to claim 1 wherein said outer sleeve comprises two symmetric, longitudinally aligned parts fixedly joined at the facing ends thereof.

References Cited in the file of this patent

UNITED STATES PATENTS

| | | |
|---|---|---|
| 200,903 | Edson | Mar. 5, 1878 |
| 2,282,589 | Mayne | May 12, 1942 |
| 2,283,871 | Norelius | May 19, 1942 |
| 2,693,397 | Baker | Nov. 2, 1954 |